(12) United States Patent
Rasmussen et al.

(10) Patent No.: US 11,149,708 B2
(45) Date of Patent: Oct. 19, 2021

(54) VACCUUM-ASSISTED MOUNTING OF VORTEX GENERATOR DEVICE ON A WIND TURBINE BLADE

(71) Applicant: LM Wind Power US Technology ApS, Kolding (DK)

(72) Inventors: Kim Ansholm Rasmussen, Kolding (DK); Jesper Høeg, Kolding (DK); Kristian Lehmann Madsen, Fredericia (DK)

(73) Assignee: LM WIND POWER US TECHNOLOGY APS, Kolding (DK)

( * ) Notice: Subject to any disclaimer, the term of this patent is extended or adjusted under 35 U.S.C. 154(b) by 92 days.

(21) Appl. No.: 16/330,634

(22) PCT Filed: Sep. 7, 2017

(86) PCT No.: PCT/EP2017/072454
§ 371 (c)(1),
(2) Date: Mar. 5, 2019

(87) PCT Pub. No.: WO2018/046594
PCT Pub. Date: Mar. 15, 2018

(65) Prior Publication Data
US 2019/0309726 A1    Oct. 10, 2019

(30) Foreign Application Priority Data

Sep. 7, 2016    (EP) .................................. 16187660

(51) Int. Cl.
*F03D 1/06*    (2006.01)
*F03D 80/00*   (2016.01)

(52) U.S. Cl.
CPC ......... *F03D 1/0675* (2013.01); *F03D 1/0633* (2013.01); *F03D 80/00* (2016.05);
(Continued)

(58) Field of Classification Search
CPC .... F03D 1/0675; F03D 1/0641; F03D 1/0633; F03D 80/00
See application file for complete search history.

(56) References Cited

U.S. PATENT DOCUMENTS 9,051,919 B2 *   6/2015  Jensen ................. F03D 1/0608
10,000,017 B2 *  6/2018  Windbichler ......... B29C 65/542
(Continued)

FOREIGN PATENT DOCUMENTS

| EP | 2484896 B1 | 4/2014 |
| EP | 2975259 A1 | 1/2016 |
| IN | 329CHE2012 A | 6/2013 |

OTHER PUBLICATIONS

International Search Report dated Nov. 24, 2017 corresponding to application No. PCT/EP2017/072454.
(Continued)

*Primary Examiner* — Richard A Edgar
*Assistant Examiner* — Jackson N Gillenwaters
(74) *Attorney, Agent, or Firm* — Nath, Goldberg & Meyer; Jerald L. Meyer; Tanya E. Harkins

(57) ABSTRACT

The subject matter is directed to a method of mounting flow-altering devices on wind turbine blades, the mounting device and the flow-altering device. The flow-altering devices having a base with an inner side for attaching to a blade, and an outer side with flow-altering device parts protruding from the base. The method provides for a mounting device with a mounting panel supporting one or more flow-altering devices; arranging the mounting panel on an area of application on the surface of the blade with an adhesive material between the inner side of the device and the surface of the blade, and with a seal between the mounting panel and the surface to form a cavity between the mounting panel and the surface of the blade; applying a negative pressure in the cavity; releasing the negative pressure; and removing the mounting panel.

11 Claims, 11 Drawing Sheets

(52) U.S. Cl.
CPC ..... *F05B 2230/604* (2013.01); *F05B 2230/80* (2013.01); *F05B 2240/122* (2013.01); *F05B 2240/221* (2013.01); *Y02E 10/72* (2013.01)

(56) References Cited

U.S. PATENT DOCUMENTS

| | | | |
|---|---|---|---|
| 2010/0224312 A1* | 9/2010 | Tsubaki | C09J 7/403 |
| | | | 156/212 |
| 2012/0257979 A1 | 10/2012 | Jensen et al. | |
| 2013/0135877 A1* | 5/2013 | Oh | H04M 1/0266 |
| | | | 362/362 |
| 2016/0039144 A1 | 2/2016 | Windbichler | |
| 2016/0126127 A1* | 5/2016 | Ikeo | G01F 5/00 |
| | | | 257/467 |
| 2016/0169190 A1* | 6/2016 | Neumann | F03D 1/0675 |
| | | | 29/889.21 |
| 2016/0215758 A1* | 7/2016 | Corten | F03D 1/0675 |
| 2018/0038342 A1* | 2/2018 | Tobin | F03D 1/0608 |
| 2018/0202417 A1* | 7/2018 | Fukami | F03D 1/0691 |
| 2019/0211800 A1* | 7/2019 | Madsen | F03D 1/0675 |

OTHER PUBLICATIONS

Indian First Examination Report dated Aug. 31, 2021 corresponding to application No. 201947011434.

\* cited by examiner

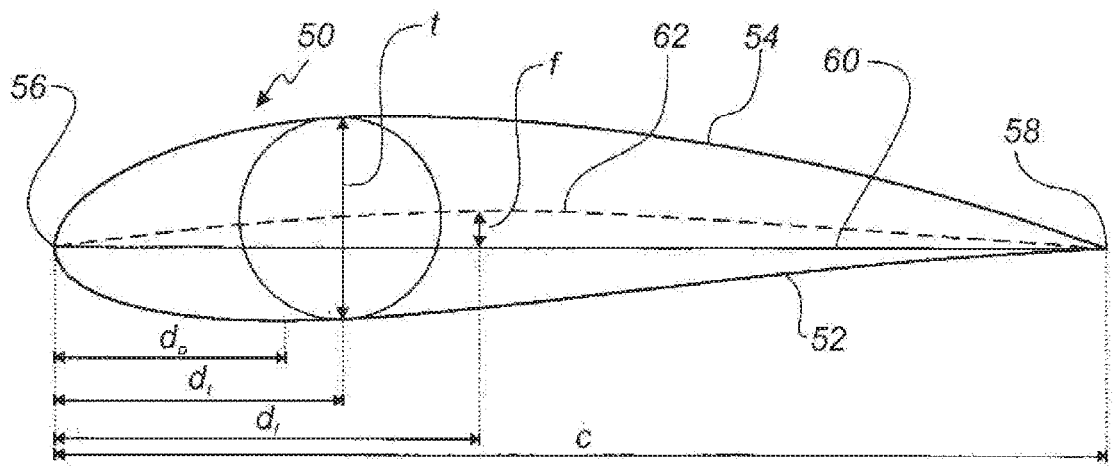
Fig. 3
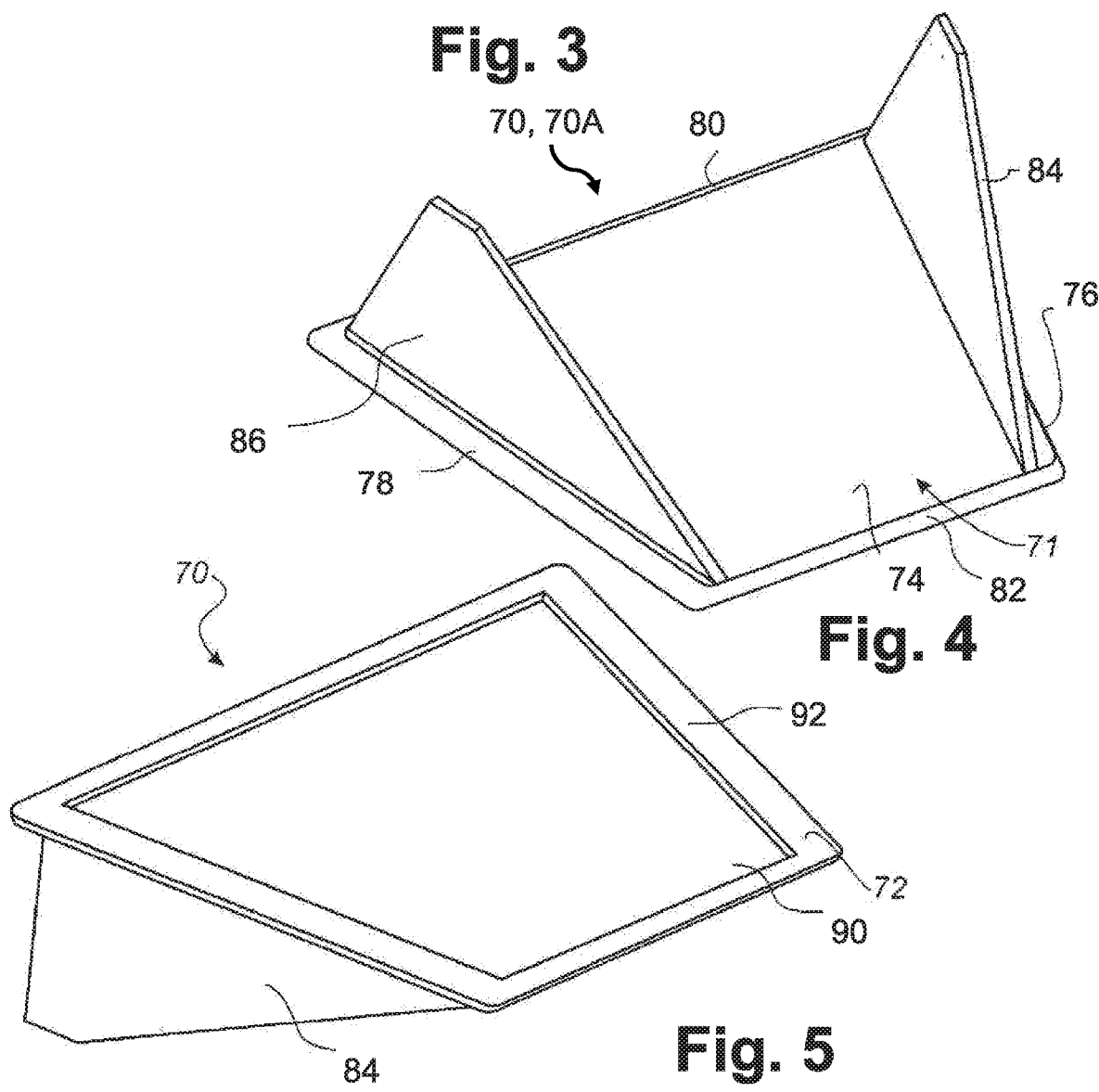
Fig. 4
Fig. 5

VACUUM-ASSISTED MOUNTING OF VORTEX GENERATOR DEVICE ON A WIND TURBINE BLADE

This is a National Phase Application filed under 35 U.S.C. 371 as a national stage of PCT/EP2017/072454, filed Sep. 7, 2017, an application claiming the benefit of European Application No. 16187660.2, filed Sep. 6, 2016, the content of each of which is hereby incorporated by reference in its entirety.

TECHNICAL FIELD

The present invention relates to a method of retrofitting flow-altering devices, such as vortex generator devices and/or turbulence generator devices, to an outer surface of a wind turbine blade, the flow-altering devices being of the type having a base comprising an inner side for attaching onto the surface of the wind turbine blade, and an outer side with one or more protruding flow-altering device parts.

BACKGROUND

Normally, when installing vortex generator (VG) devices, such as VG strips, on a wind turbine blade, a recess is milled or otherwise cut into the blade, wherein the base plate of the vortex generator strip is inserted so that the top surface of the base plate is substantially flush with the surface of the blade. Accordingly, the base plate of the strip does not protrude from the surface of the blade, whereby the risk of the strip being ripped loose during normal use of the wind turbine blade is reduced. Further the risk of the base plate contributing undesired effects to the flow or causing noise is reduced. However, the attachment method is tedious and for structural reasons it may be undesirable to mill a recess into the surface of the blade. Accordingly, in many aspects, it is desirable to mount the vortex generator strip directly on the surface of the wind turbine blade.

WO2007/140771 describes a solution where a vortex generator strip is mounted directly on the surface of a wind turbine blade, e.g. by use of an adhesive film. A joint area of the vortex generator strip is completely or partially covered by sealing means in order to prevent the vortex generator strip from being ripped off the blade during use. In the document a joint area is defined as the area where the perimeter of the strip meets the surface and where a more or less visible gap between the strip and the blade surface and the surroundings is formed. It is recognised that this solution involves an additional step of sealing the perimeter of the vortex generator strip after the strip has been mounted on the surface of the blade. It is desirable to omit this step when retrofitting vortex generator devices to the surface of the wind turbine blade.

US 2016/0169190 discloses a method of installing a surface feature on a wind turbine rotor blade using a seal between at least a portion of the surface feature and the rotor blade to form a chamber there between. According to the method, a vacuum is pulled from the chamber to produce a substantially uniform force pulling the surface feature against the surface of the rotor blade.

US 2016/0039144 discloses a method where a pressing tool is utilized to install a base plate with a vortex generator on a section of a rotor blade.

The prior art solutions are cumbersome and do not provide an easy way of handling vortex generator devices and easily applying the vortex generator devices to the wind turbine blade. This problem is even more prominent when a plurality of devices is to be retrofitted to the surface of the blade.

SUMMARY

Accordingly, there is a need for systems and methods that will facilitate mounting of vortex generator devices and other flow-altering devices on a wind turbine blade. Further, it is an object of the invention to provide a method and system for mounting flow-altering devices which address the above problems, in particular providing improved and uniform mounting strength of flow-altering devices.

A method of mounting flow-altering devices on a wind turbine blade is provided, the flow-altering devices being of the type having a base comprising an inner side for attaching onto a surface of the wind turbine blade, and an outer side with one or more flow-altering device parts protruding from the base, the method comprising providing a mounting device with a mounting panel supporting one or more flow-altering devices, the one or more flow-altering devices including a first flow-altering device; arranging the mounting panel on an area of application on the surface of the wind turbine blade to form a cavity between the mounting panel and the surface of the wind turbine blade; applying a negative pressure in the cavity; releasing the negative pressure in the cavity; and removing the mounting panel from the area of application on the surface of the wind turbine blade.

In the method, arranging the mounting panel on an area of application on the surface of the wind turbine blade to form a cavity between the mounting panel and the surface of the wind turbine blade may comprise arranging the mounting panel with an adhesive material, optionally including an adhesive tape, between the inner side of the first flow-altering device and the surface of the wind turbine blade, and with a seal between the mounting panel and the surface. Accordingly, the method may comprise arranging the mounting panel on an area of application on the surface of the wind turbine blade with an adhesive material between the inner side of the first flow-altering device and the surface of the wind turbine blade, and with a seal between the mounting panel and the surface to form a cavity between the mounting panel and the surface of the wind turbine blade.

Also disclosed is a mounting device for mounting flow-altering devices on a wind turbine blade, the mounting device comprising a mounting panel having a first side and a second side, the mounting panel having a first support recess in the first side for receiving a flow-altering device part of a flow-altering part.

The mounting device may comprise a seal encircling a first area of the first side, e.g. for forming a cavity between a part of the first side of the mounting panel and a surface of the wind turbine blade. The first area may include the first support recess, i.e. the seal may encircle the first support recess.

The mounting panel may comprise a port for connecting a pressure source to the cavity. The mounting panel may be elongate.

Further, use of a mounting device as described herein for mounting flow-altering devices, such as vortex generator devices, on a wind turbine blade is disclosed. Even further, a kit of parts is disclosed, the kit of parts comprising a plurality of flow-altering devices as disclosed herein and a mounting device as disclosed herein.

Even further, a flow-altering device having a base comprising an inner side for attaching onto a surface of the wind turbine blade is disclosed. The base comprises an outer side with one or more flow-altering device parts protruding from the base, e.g. a first fin protruding from the outer side and extending along a first fin axis, the first fin axis being parallel to the base. The flow-altering device comprises an adhesive material arranged on the inner surface, wherein the adhesive material optionally has one or more slits and/or one or more channels for reducing air bubble formation between the flow-altering device and the surface of the wind turbine blade.

The method comprises applying a negative pressure in the cavity. In the present context, the term "negative pressure" refers to a situation in which an enclosed volume, e.g. the cavity formed by the mounting device and the surface of the wind turbine blade, has lower pressure than its surroundings. For example, a pressure source, e.g. a pump device, may apply a negative pressure to the cavity, e.g. to obtain a pressure difference between the cavity and the surroundings. The pressure difference between the cavity and the surroundings may be in the range from 0.3 bar to 1.2 bar, such as in the range from 0.5 bar to 1.1 bar. In one or more exemplary methods, the pressure difference between the cavity and the surroundings is in the range from 0.8 bar to 1.0 bar.

By applying a negative pressure to the cavity, the mounting panel presses the flow-altering devices towards the outer surface of the wind turbine blade. It is an important advantage of the present disclosure, that a uniform pressure is applied to the different flow-altering devices supported by the mounting device during mounting. Further, variations in mounting pressure are heavily reduced, enabling high mounting quality of the flow-altering devices.

In the method, the seal may be arranged on the mounting panel prior to arranging the mounting panel on an area of application.

The mounting panel may comprise a port. In the method, the negative pressure may be applied through the port. The mounting panel may comprise a pressure source connector for connecting a pressure source, e.g. a pump device, to the port, e.g. via a pressure hose. The mounting device may comprise a pressure source, such as a pump, connected to the port.

The mounting device may comprise a pressure release mechanism for releasing a pressure in the cavity. In the method, the negative pressure in the cavity may be released by activating the pressure release mechanism. The pressure source connector and/or the pressure source may operate as the pressure release mechanism, e.g. by decoupling of the pressure source from the mounting panel and/or controlling the pressure source to apply a release pressure to the cavity. The pressure release mechanism may comprise a release valve, which when activated form a pressure release path between the cavity and the surroundings.

The one or more flow-altering devices may comprise a plurality of flow-altering devices. For example, the one or more flow-altering devices may comprise a second flow-altering device. Accordingly, the mounting panel may support and/or be configured to support a plurality of flow-altering devices, such as, two, three, four, five, six, or more flow-altering devices. The mounting panel may support and/or be configured to support single-fin and/or double-fin flow-altering devices, e.g. at least six single-fin flow-altering devices or at least three double-fin flow-altering devices.

The flow-altering device, e.g. in the form of a vortex generator device, has a base comprising an inner side for attaching onto a surface of the wind turbine blade, such as the exterior of the wind turbine blade, and an outer side facing away from the exterior of the wind turbine blade, with one or more flow-altering device parts, such as one or more fins, the one or more fins comprising a first fin and optionally a second fin, the flow-altering device parts protruding from the outer side of the base. The inner side may comprise a curved, e.g. concave, surface part. The base may advantageously be trapezium-shaped with a first edge part, a second edge part, a third edge part, and a fourth edge part, optionally with rounded corners. The third edge part is longer than the fourth edge part. In particular for a double-fin vortex generator device, the first fin is optionally arranged at and substantially parallel to the first edge part of the base, and the second fin is optionally arranged at and substantially parallel to the second edge part of the base.

The first edge part and the second edge part may, e.g. for a single-fin flow-altering device, form a primary angle in the range from 5 degrees to 30 degrees, such as in the range from 15 degrees to 30 degrees, preferably 24 degrees. A first primary fin angle between the first edge part and the first fin axis may be in the range from 5 degrees to 30 degrees, such as in the range from 5 degrees to 20 degrees, preferably 12 degrees. A first secondary fin angle between the second edge part and the first fin axis may be in the range from 5 degrees to 30 degrees, such as in the range from 5 degrees to 20 degrees, preferably 12 degrees. First fin angles larger than 5 degrees between the first/second edge part and the first fin axis entails that one of the first or second edge parts is substantially perpendicular to the leading edge of the wind turbine blade when mounted on the wind turbine blade. Thus undesired noise, flow or turbulence caused by edge parts is reduced.

A perimeter or rim of the base may be tapered or rounded in order to obtain a gradual transition to the surface of the wind turbine blade. The flow-altering device may be made of or at least comprise wood, aluminium or stainless steel. However, according to an advantageous embodiment, the flow-altering device is made of or at least comprises a polymer material, such as TPU, PBT, PET or LDPE. The flow-altering device may be made of or at least comprise a composite material, e.g. comprising glass fibre laminates and/or carbon laminates, optionally with polyester, vinyl esther, epoxy, polymers (thermosetting and/or thermoplastic) as a second component. The vortex generator device may also be made of polycarbonate (PC) or a combination of PBT and PC. Accordingly, the vortex generator device may according to an advantageous embodiment be moulded.

In one or more advantageous embodiments, the inner side of the base is concave. Thus, the flow-altering device(s) is/are adapted to conform to a curved surface, such as the surface of a wind turbine blade. The entire base, i.e. both the inner side and the outer side, may of course be curved, but the two sides need not have the same curvature. The curvature may be set as an average of the curvature of blade sections, for which the devices are intended so as to be pre-curved to fit to a large number of different blades and/or blade sections.

In one or more exemplary vortex generator devices, a height of the first fin and/or the second fin increases from a first end towards a second end thereof, at least along a part of the fins. The shape of the first fin and/or the second fin may for instance be substantially triangular or wedge-shaped. However, the shape may deviate from this form by for instance having a somewhat flattened top edge portion, and the derivative of the height may for instance increase and/or decrease from the first end towards the second end. However, in general, the fin will have a minimum height at the first end of the fin (or equivalently near or at the fourth edge part of the base) and its maximum height at the second end of the fin (or equivalently near or at the third edge part of the base). The third edge part of the base may also be denoted trailing edge part and the fourth part of the base may also be denoted leading edge part. The fin(s) may be formed integrally with the base. Alternatively, the base and fin(s) may be manufactured as separate parts which are subsequently coupled or adhered to each other.

A fin, such as the first fin and/or the second fin, may comprise a second edge portion (also denoted trailing edge portion) located nearest the second end of the fin, wherein the second edge portion is tapered towards the second end of the fin, and/or the fin is tapered towards a top edge portion of the fin. Thus, it is clear that the fin optionally has a second edge portion, in which the height of the fin decreases towards the second end of the fin, and/or that the thickness of the fin, i.e. the distance between a first side and a second side of the fin, decreases towards a top portion of the fin. Thereby, it is possible to manufacture the vortex generator device by moulding and ensuring that the moulded vortex generator device may be released from the mould without parts of the vortex generator device breaking apart. At the same time, the functionality of the vortex generator device is not impaired compared to conventional vortex generator devices having a triangular shaped fin with a non-tapered trailing edge part and non-tapered thickness.

The trailing edge portion of a fin may form an average trailing edge tapering angle to a surface normal to the base in an interval between 1 and 20 degrees, or between 1 and 15 degrees, or between 1 and 10 degrees. Advantageously, the average trailing edge tapering angle is between 4 and 8 degrees, e.g. around 6 degrees. Of course, the trailing edge portion should also form the same angle to a surface normal to the wind turbine blade, when mounted on a surface of the wind turbine blade. The term "average angle" is used, since the trailing edge portion may be slightly curved. The trailing edge portion may be substantially straight.

According to another advantageous embodiment, sides of a fin, such as the first fin and/or the second fin, form a thickness-tapering angle between 0.5 and 5 degrees, or between 0.5 and 3.5 degrees, or between 0.5 and 2 degrees. Thus, the fin is substantially tapered towards a top portion of the fin.

In one or more exemplary vortex generator devices, the first fin and the second fin are tilted towards each other, each forming a tilt angle to a surface normal being between 0.5 and 3 degrees. Thus, the first fin and the second fin may be slightly inclined towards each other.

Advantageously, the first edge portion of a fin may extend along at least 50%, or at least 60%, or at least 70%, or at least 75% of a total length of the fin. The first/leading edge portion may even extend along at least 80% or 85% of the total length of the fin.

A fin, such as the first fin and/or the second fin, optionally comprises a flattened top edge portion. Accordingly, the fin may for instance have an intermediate edge portion, where the height of the fin is substantially constant. However, this edge portion may also be slightly rounded or the like.

The flow-altering device, such as the VG device, may comprise an adhesive or bonding material arranged on the inner surface, wherein the adhesive material optionally has one or more slits for reducing air bubble formation between the flow-altering device and the surface of the wind turbine blade. The adhesive material may comprise an adhesive film or adhesive layer, such as a double adhesive tape having two adhesive layers. The adhesive material may be covered by a peel-off layer. The method may comprise removing the peel-off layer prior to arranging the mounting panel on the area of application. Thereby, the adhesive material may be protected in order to maintain the adhesive properties of the adhesive material until the flow-altering device is mounted on a wind turbine blade. The adhesive material may comprise a layer of compressible material that may be used for compensating for variations so as to exactly fit to the curvature of the wind turbine blade.

The adhesive material has adhesive properties, shape and size (area) providing sufficient adhesive strength for securely mounting the flow-altering device(s) on the surface of the wind turbine blade. The adhesive material may be a pressure-sensitive material or tape, thereby providing a simple solution when fitting the flow-altering device to the surface of a wind turbine blade, as the worker only has to apply pressure to the outer surface of the base and/or to the flow-altering device part(s) of the flow-altering device. The adhesive material may be acrylic based, e.g. an acrylic foam tape. The adhesive material may have a thickness in the range from 0.5 mm to 3 mm, preferably in the range from 0.5 mm to 1.5 mm.

The adhesive material may have one or more slits or cut-outs, e.g. for reducing air bubble formation between the first flow-altering device and the surface of the wind turbine blade. The one or more slits or cut-outs may be made in the adhesive material/tape to reduce the risk of air being trapped inside the tape during mounting by reducing the maximum distance for adhesive material surface points to an edge of the adhesive material. When the adhesive material/tape is pressed towards the blade surface, the adhesive material tends to bond along the edge of the adhesive material, which then functions as a sealing where air in the middle of the adhesive material cannot escape. The one or more slits, such as a first slit, secure that the air can leave, thus improving the bonding quality. A slit may have a constant or varying width. A slit may have a depth of at least 10 mm. In one or more exemplary flow-altering devices, a slit, e.g. the first slit, and/or at least one channel extends from the third edge part (trailing edge part) of the flow-altering device to reduce the risk of water or debris being caught in the recess. The first slit may be straight or curved. In one or more exemplary flow-altering devices, the first slit is straight and parallel (±5 degrees) with the first fin axis.

The adhesive material may be V-shaped, E-shaped, U-shaped or trident-shaped, e.g. for reducing air bubble formation between a flow-altering device and the surface of the wind turbine blade. The adhesive material may comprise a first part, optionally having a primary portion with one or more leg portions extending from the primary portion. A first leg portion and a second leg portion of the one or more leg portions may be parallel or angled, e.g. at least 5 degrees. A leg portion may be straight. The adhesive material may comprise a second part, e.g. separated from the first part. The adhesive material may comprise a third part, e.g. separated from the first part and/or the second part. A first part and a second part of the adhesive material may form or be separated by a channel or gap there between. A channel or channel sections of a channel between different parts of the adhesive material may prevent or at least reduce the risk of water being trapped between the surface of the wind turbine blade and the flow-altering device during operation of the wind turbine blade and thus operating as a drainage channel.

In one or more exemplary flow-altering devices, the inner side of the base is provided with a recess or undercut for obtaining the adhesive material. Thereby, the adhesive material, e.g. in form of an adhesive tape, may be inserted into the recess or undercut so that the surrounding parts of the inner side of the base protects the adhesive, once the flow-altering device is mounted on the surface of a wind turbine blade, since the surrounding parts may contact the blade. Accordingly, the need for subsequently sealing the edge parts of the base may be reduced. Further, a recess may allow for use of a thicker adhesive material, which may reduce the material costs.

In the method, providing a mounting panel supporting one or more flow-altering devices may comprise inserting flow-altering device part(s) of the one or more flow-altering devices into corresponding support recesses in the mounting panel. In the method, providing a mounting panel supporting one or more flow-altering devices may comprise inserting a flow-altering device part of a single-fin flow-altering device into a corresponding support recess. A single-fin flow-altering device has a single flow-altering device part, such as a fin, protruding from the outer side of the base.

The one or more flow-altering devices may comprise vortex generator device(s) and/or turbulence generator device(s). A flow-altering device, e.g. a first flow-altering device and/or a second flow-altering device, may be selected from the group consisting of a vortex generator device, a rotor blade extension, a serration panel and a turbulence generator device. The flow-altering devices may for instance be vane vortex generators. Accordingly, the protruding flow-altering device parts may be fins or vanes.

The method may comprise applying a release pressure, such as a neutral or positive pressure in the cavity, optionally after releasing the negative pressure in the cavity, e.g. in order to assist in removing the mounting panel from the area of application. The release pressure may be a slightly negative pressure. Accordingly, removing the mounting panel from the area of application on the surface of the wind turbine blade may comprise applying a release pressure, such as a positive pressure or neutral pressure, in the cavity. In the present context, the term "positive pressure" refers to a situation in which an enclosed volume, e.g. the cavity formed by the mounting device and the surface of the wind turbine blade, has higher pressure than its surroundings. In the present context, the term "neutral pressure" refers to a situation in which an enclosed volume, e.g. the cavity formed by the mounting device and the surface of the wind turbine blade, has the same pressure as the surroundings. For example, a pressure source, e.g. a pump device, may apply a positive pressure to the cavity, e.g. to obtain a pressure difference between the cavity and the surroundings.

The method and/or mounting device disclosed herein enable precise and/or simple mounting of flow-altering devices on a wind turbine blade with reduced risk of mounting errors, such as wrong positioning of flow-altering devices and/or weak bonding of the flow-altering device to the wind turbine blade. Further, applying a uniform and reproducible mounting pressure make the mounting of flow-altering devices more robust.

The mounting device comprises a mounting panel having a first side and a second side. The mounting panel may be elongated having a first end and a second end. The mounting panel may have a length in the range from 30 cm to 2 m, such as 1 m. Thus a mounting panel that is easy to handle is provided, while enabling mounting of a plurality of flow-altering devices in one mounting operation.

The mounting panel has one or more support recesses including a first support recess in the first side, e.g. for receiving flow-altering device part(s) of flow-altering device(s). The mounting panel may at least partly be made of a light-weight polymer material, such as a foamed polymer, such as polyethylene (PE).

The mounting device optionally comprises a seal. The seal may be a plastic or rubber seal. The seal may be adhesively and/or mechanically attached to the mounting panel. The seal may in a relaxed state have a relaxed height $h_r$ in the range from 2 mm to 30 mm, such as in the range from 5 mm to 20 mm. The seal may in a fully compressed state have a compression height $h_c$ less than $0.5*h_r$, where $h_r$ is the relaxed height of the seal. In one or more exemplary mounting devices, the seal has a compression height $h_c$ in the range from 1 mm to 20 mm. The seal may comprise one or more channels formed in the seal material. The seal may be a D-profile, e.g. having a relaxed height of 6 mm and/or a relaxed width of at least 3 mm, such as 5 mm or 8 mm. The seal may comprise a foamed polymer material, e.g. a closed cell foamed polymer. The foamed polymer material may be a closed cell foam and/or of low density, e.g. have a density less than 200 kg/m$^3$.

One or more exemplary mounting panels may comprise a first set of first support recesses for receiving flow-altering device part(s) of a first flow-altering device and/or a second set of second support recesses for receiving flow-altering device part(s) of a second flow-altering device.

A support recess, e.g. first support recess and/or second support recess, may be asymmetric or irregular. An asymmetric support recess may prevent wrong insertion of a flow-altering device in the mounting panel, thus ensuring/facilitating correct insertion of a flow-altering device in the mounting panel. This is in particular the case, when single-fin flow-altering devices are to be inserted in the mounting panel for mounting on the wind turbine blade. In one or more exemplary mounting panels, support recess(es), e.g. the first support recess and/or a second support recess, extends from a first end to a second end, the first support recess having a first depth near or at the first end and a second depth near or at the second end, wherein the first depth may be different from the second depth. The support recesses may be wedge-shaped or triangular. The first depth may be in the range from 0 to 100 mm and/or the second depth may be in the range from 10 mm to 120 mm. A support recess, such as the first support recess and/or the second support recess may have a length larger than $0.8*L_f$, where $L_f$ is the fin length of the flow-altering device part to be inserted in the support recess. In one or more exemplary mounting panels, the length of the first support recess and/or the second support recess is larger than 20 mm, such as in the range from 40 mm to 120 mm.

A support recess, e.g. the first support recess and/or a second support recess, may have a first width at a first position between the first end and the second end, and a second width at a second position between the first end and the second end. The first width may be different from the second width. A support recess, e.g. the first support recess and/or a second support recess, may have a first depth at a first position between the first end and the second end, and a second depth at a second position between the first end and the second end. The first depth may be different from the second depth. The first position is different from the second position and closer to the first end than the second position.

The mounting device may comprise a pressure release mechanism for releasing a pressure in the cavity. The pressure release mechanism, such as a release valve, may be arranged on the mounting panel, e.g. between a release inlet port, e.g. arranged in the second side of the mounting panel, and one or more release outlet ports in the first side. The pressure release mechanism, such as a release valve, may be arranged in the seal. Thereby, the release valve, when activated or opened, form a pressure release path between the cavity and the surroundings. A release outlet port may be arranged within a support recess. A release outlet within a support recess may assist in separating the mounting panel/mounting device from the flow-altering devices upon mounting by allowing air to push the flow-altering device(s) away from the mounting panel. Thereby, releasing the negative pressure in the cavity may assist in removing the mounting panel. The pressure source connector and/or the pressure source may operate as the pressure release mechanism, e.g. by decoupling of the pressure source from the mounting panel and/or controlling the pressure source to apply a release pressure to the cavity.

Thus, a method of efficient and uniform fitting or retrofitting flow-altering devices to the surface of the wind turbine blade is provided. The mounting device including mounting panel with inserted flow-altering devices may be brought as a single device to for instance the site of a wind turbine provided with wind turbine blades, which are to be retrofitted with flow-altering devices. Further, the method and devices disclosed herein reduces the risk of mounting errors by securing a good adhesion of flow-altering devices to the wind turbine blades.

The outer side of flow-altering device(s) will once mounted on a surface of a wind turbine blade face away from the surface of the wind turbine blade so that the protruding flow-altering device parts protrude from the surface of the wind turbine blade.

According to one or more advantageous embodiments, the method is carried out in situ on a wind turbine blade installed on the rotor of a wind turbine. Of course, the method may also be carried out on a wind turbine blade prior to installing the wind turbine blade on a rotor of a wind turbine, e.g. after manufacture of the wind turbine blade.

BRIEF DESCRIPTION OF THE DRAWINGS

The invention is explained in detail below with reference to one or more examples shown in the drawings, in which FIG. 3 shows a schematic view of an airfoil profile, FIG. 4 shows a schematic first perspective view of exemplary vortex generator devices, FIG. 5 shows a schematic second perspective view of the vortex generator device in FIG. 4 without adhesive material, FIGS. 8a-h show different shapes of fins for vortex generator devices according to the invention.

DETAILED DESCRIPTION

Figure 1:
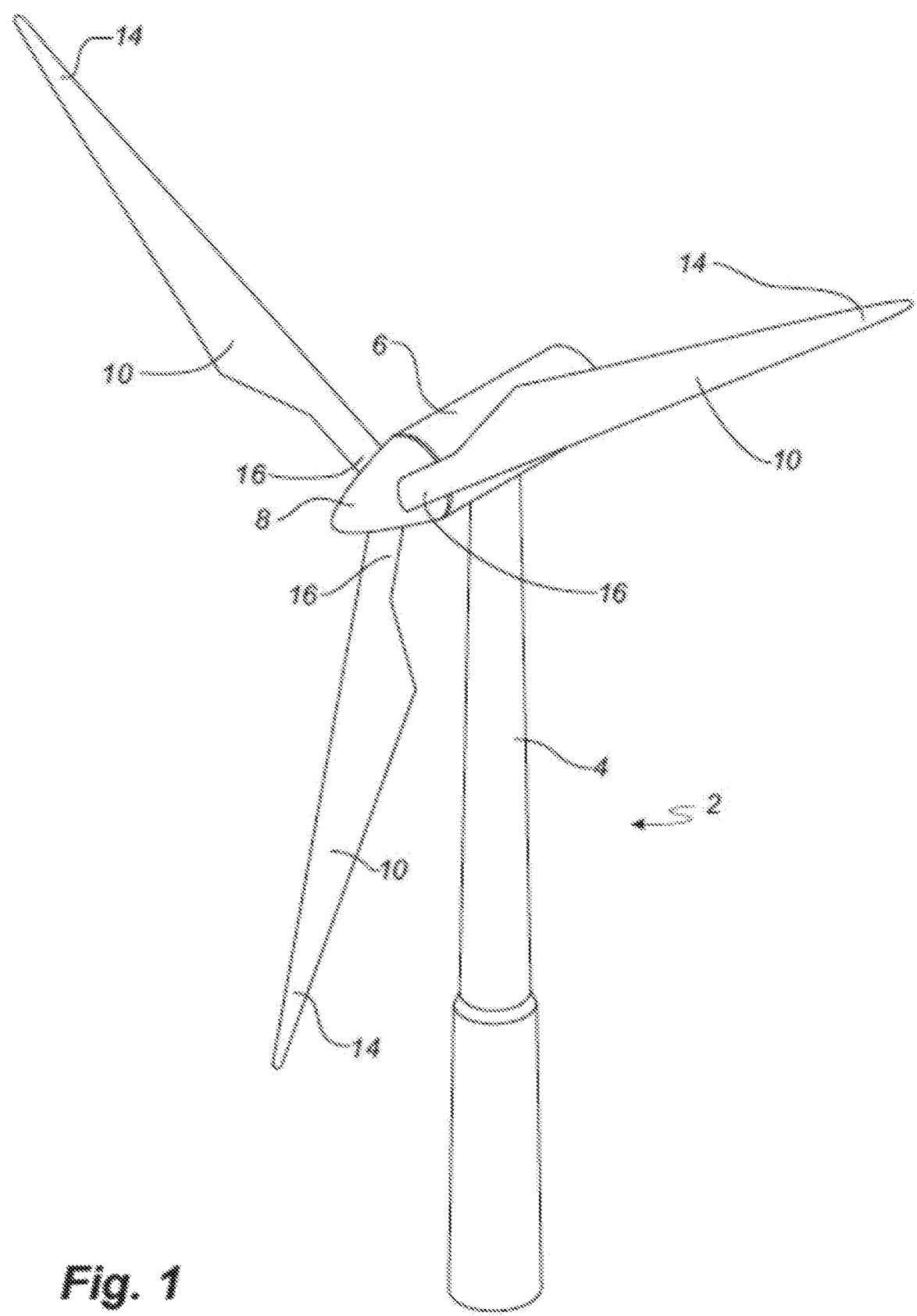
FIG. 1 shows a schematic view of a wind turbine.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8 and three wind turbine blades 10 extending radially from the hub 8, each having a blade root 16 nearest the hub and a blade tip 14 furthest from the hub 8. The rotor has a radius denoted R.

Figure 2:
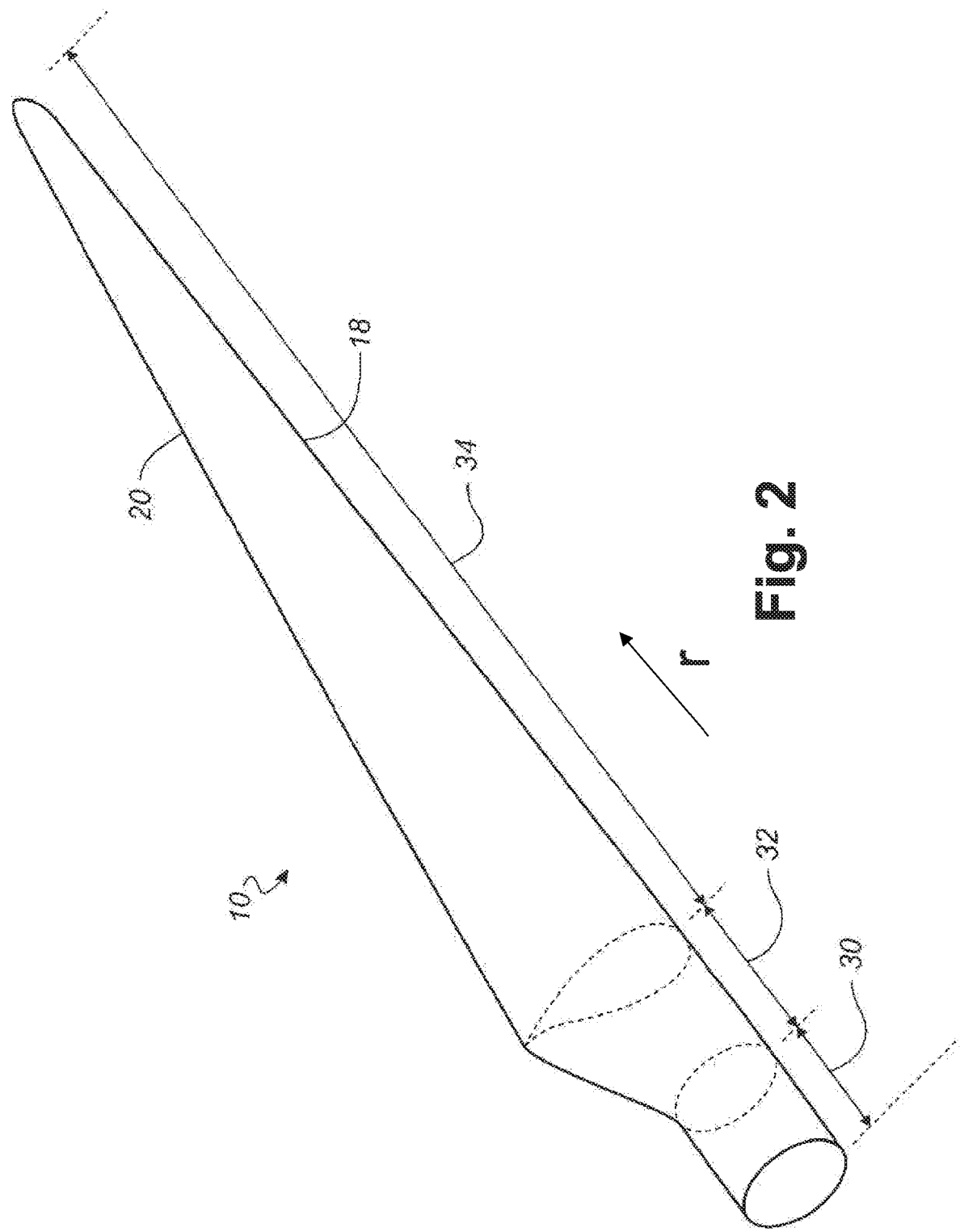
FIG. 2 shows a schematic perspective view of a wind turbine blade.

FIG. 2 shows a schematic perspective view of a wind turbine blade 10. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations typically has a substantially circular or elliptical cross-section, which for instance makes it easier and safer to mount the blade 10 to the hub. The diameter (or the chord) of the root region 30 is typically constant along the entire root area 30. The transition region 32 has a transitional profile gradually changing from the circular or elliptical shape of the root region 30 to the airfoil profile of the airfoil region 34. The chord length of the transition region 32 typically increases substantially linearly with increasing distance r from the hub.

The airfoil region 34 has an airfoil profile with a chord extending between the leading edge 18 and the trailing edge 20 of the blade 10. In the airfoil region 34, the width of the chord decreases with increasing distance r from the hub.

It should be noted that the chords of different sections of the blade normally do not lie in a common plane, since the blade may be twisted and/or curved (i.e. pre-bent), thus providing the chord plane with a correspondingly twisted and/or curved course, this most often being the case in order to compensate for the local velocity of the blade being dependent on the radius from the hub.

FIG. 3 shows a schematic view of an airfoil profile 50 of a typical blade of a wind turbine depicted with the various parameters, which are typically used to define the geometrical shape of an airfoil. The airfoil profile 50 has a pressure side 52 and a suction side 54, which during use—i.e. during rotation of the rotor—normally faces towards the windward (or upwind) side and the leeward (or downwind) side, respectively. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord 60 is called the camber f. The asymmetry can also be defined by use of parameters called the upper camber (or suction side camber) and lower camber (or pressure side camber), which are defined as the distances from the chord 60 and the suction side 54 and pressure side 52, respectively.

Airfoil profiles are often characterised by the following parameters: the chord length c, the maximum camber f, the position $d_f$ of the maximum camber f, the maximum airfoil thickness t, which is the largest diameter of the inscribed circles along the median camber line 62, the position $d_t$ of the maximum thickness t, and a nose radius (not shown). These parameters are typically defined as ratios to the chord length c. Thus, a local relative blade thickness t/c is given as the ratio between the local maximum thickness t and the local chord length c. Further, the position $d_p$ of the maximum pressure side camber may be used as a design parameter, and of course also the position of the maximum suction side camber.

Figure 6:
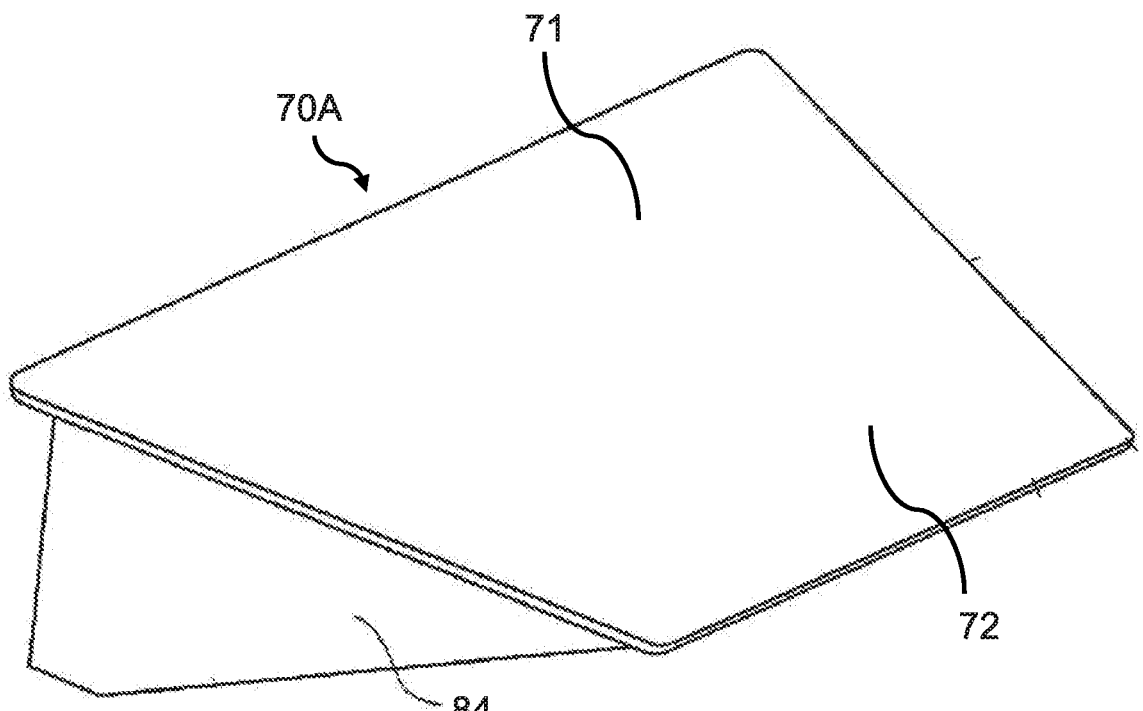
FIGS. 6 and 7 show a schematic second perspective view of the vortex generator device in FIG. 4 without adhesive material and with adhesive material.
Figure 7:
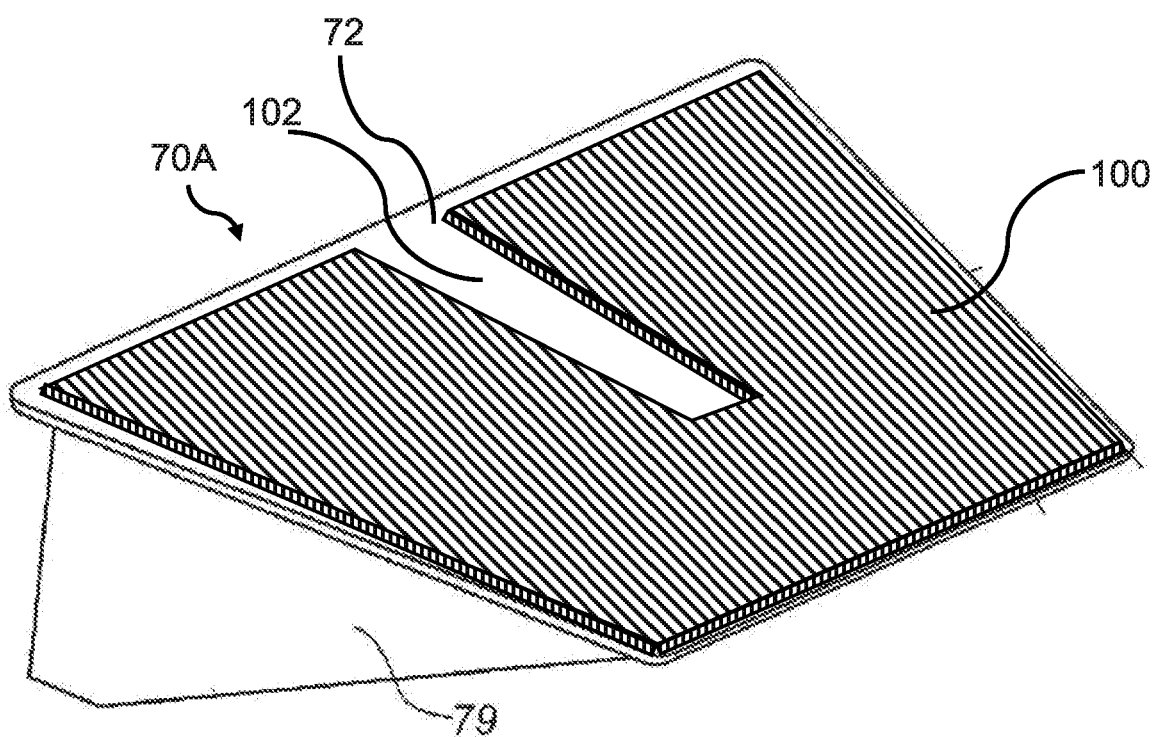

FIGS. 4-7 show different views of flow-altering devices according to the present invention. The flow-altering devices are vortex generator (VG) devices 70, 70A, where FIGS. 4 and 5 show first and second perspective views of VC device 70 and FIGS. 4, 6 and 7 show perspective views of VC device 70A.

The VG devices 70, 70A are double-fin VG devices comprising a base 71 having (when mounted to an exterior of the wind turbine blade), an inner side 72 for attaching to the exterior of the wind turbine blade, and an outer side 74 facing away from the exterior of the wind turbine blade. The base 71 has a first edge part 76, a second edge part 78, a third edge part 80 (or trailing edge part), and a fourth edge part 82 (or leading edge part). The base 71 is trapezium-shaped so that the third edge part 80 is straight and parallel to the straight fourth edge part 82 and so that a length of the fourth edge part 82 of the base 71 is smaller than a length of the third edge part 80 of the base 71. The base may advantageously be formed with a rounded perimeter as further shown in FIG. 8.

The VG devices 70 comprise a fin pair comprising a first fin 84 and a second fin 86, also called vanes, which protrude from the outer side 74 of the base 71. The first fin 84 is oriented at and parallel to the first edge part 76 of the base 71, and the second fin 86 is oriented at and parallel to the second edge part 78 of the base 71.

FIG. 5 shows a second perspective view of the VG device 70 without adhesive material, where the inner side 72 of the base 71 can be seen. The inner side 72 of the base 71 is provided with a recess 90 or undercut. The recess 90 has a perimeter, which is parallel to a perimeter of the base 71. Thus, the perimeter of the recess 90 is also trapezium-shaped with edge parts, which are parallel to the first edge part 76, second edge part 78, third edge part 80 and fourth edge part 82, respectively. The recess 90 is thus surrounded by a surrounding wall 92. The wall 92 is adapted to protect an adhesive material (not shown) arranged within the recess 90 so that the VG device 70, when mounted on the exterior of the wind turbine blade, does not become ripped loose from the exterior of the wind turbine blade.

FIG. 6 shows a second perspective view of the VG device 70A without adhesive material, where the inner side 72 of the base 71 can be seen without a recess.

FIG. 7 shows the second perspective view of the VG device 70A with an adhesive material 100 arranged on the inner side 72. The adhesive material 100 has a first slit 102 for reducing air bubble formation between the flow-altering device and the surface of the wind turbine blade when the VG device 70A is mounted on a wind turbine blade. This is in particular advantageous when the inner side is curved. The first slit 102 has a varying width.

Figure 8:
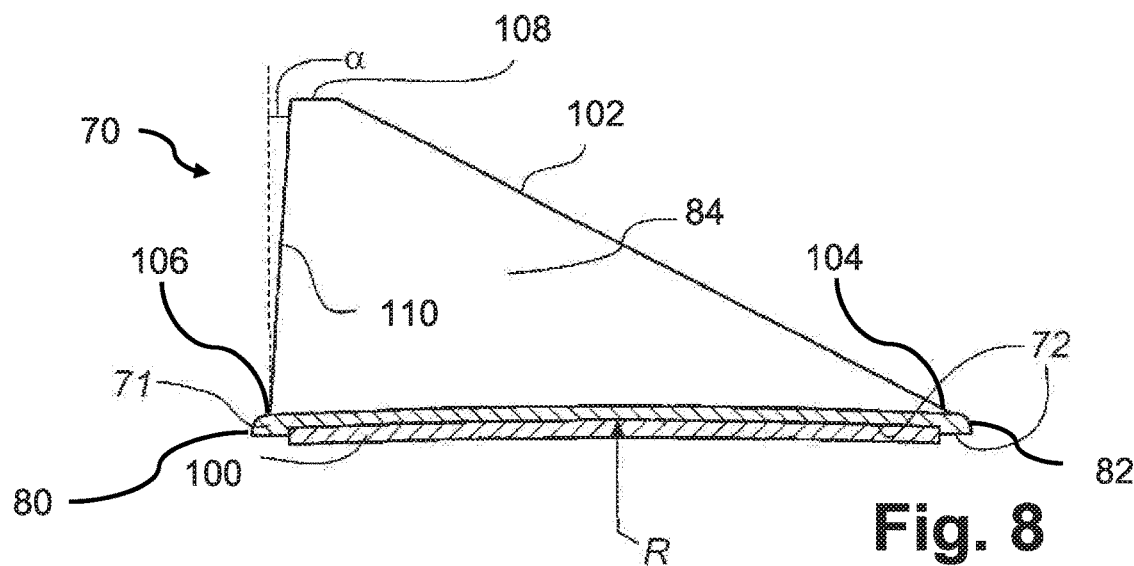
FIG. 8 shows a cross section of an exemplary vortex generator device.
Figure 9:
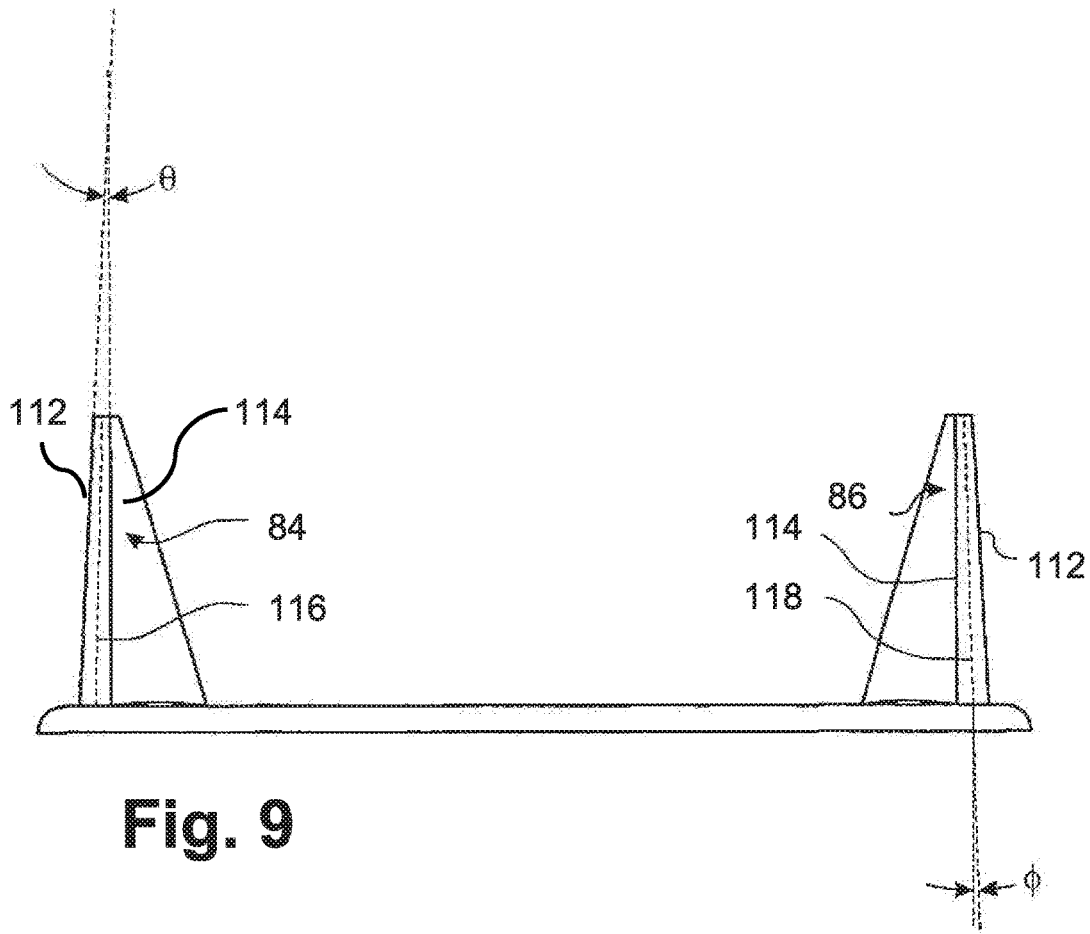
FIG. 9 shows another side view of an exemplary vortex generator device.

FIG. 8 shows a cross-section of the VG device 70, and FIG. 9 shows a side view seen from a trailing edge side of the vortex generator device.

FIG. 8 shows a cross-section of the VG device 70, wherein the first fin 84 can be seen. The VG device 70 is depicted with adhesive material 100 arranged on the inner side 72 within the recess 90. It can be seen that the base 71 is curved so that the inner side 72 of the base 71 is concave between the third edge part 80 and the fourth edge part 82 of the base 71 and has a curvature radius R. The curvature radius is chosen as an average of the curvature of blade sections, for which the particular VG device 70 is intended so as to be pre-curved to fit to a large number of different blades and/or blade sections. Advantageously, the adhesive material 100 comprises at least an adhesive outer layer for mounting on the exterior of the wind turbine blade and a layer of compressible material, such as a layer of foamed polymer or foam cells. The adhesive material 100 is thus adapted for compensating for variations so as to exactly fit or conform to the curvature of exterior of the blade. The curvature of the inner side 72 of the base 71 and the outer side 74 of the base 71 need not be the same.

Further, FIG. 8 illustrates the shape of the fins. It can be seen that the fins comprises a first edge portion 102 also denoted leading edge portion, wherein a height of the fin increases from a first end 104 of the fin towards a second end 106 of the fin and towards the third edge part 80 of the base 71, an intermediate edge portion or top edge portion 108, wherein a height of the fin is substantially constant, and a second edge portion 110 also denoted trailing edge portion, wherein a height of the fin is decreasing towards the second end 106 and the third edge part 80 of the base 71. In the depicted embodiment, the fin comprises a substantially straight second edge portion 110, i.e. so that the height of the fin linearly decreases along this portion. Thus, the second edge portion 110 is tapered so that the fin forms a trailing edge tapering angle α with a surface normal to a plane of the base 71 (and the exterior of the wind turbine blade). The trailing edge tapering angle α is advantageously around 6 degrees.

It is recognised that the fin(s) may have various shapes. Thus, the fin may for instance has a shape as a right triangle as shown in FIG. 8a, or it may comprise a tapered second edge part with a flattened top as shown in FIG. 8b or without a flattened top in FIG. 8c. The fin may also comprise an intermediate edge portion having a different tapering angle as shown in FIG. 8d, or a rounded top edge portion as shown in FIG. 8e. The first or leading edge part of the fin may be straight top part as shown in FIGS. 8a-e, or concave as shown in FIG. 8f or convex as shown in FIG. 8g. The first or leading edge part of the fin may comprise both concave and convex segments (not shown). The trailing edge part may also be concave or convex as shown in FIG. 8h. The second or trailing edge part of the fin may comprise both concave and convex segments (not shown).

FIG. 9 shows a side view of the VG device seen from third edge part 80 of the base 71. It can be seen that the fins are tapered so that first sides 112 and second sides 114 of the fins are tapered towards a top portion of the fins with a thickness-tapering angle θ. The thickness-tapering angle θ may for instance be between 1 and 2 degrees. Further, the first fin 84 and the second fin 86 may be inclined towards each other so that a first tilt axis 116 of the first fin 84 and a second tilt axis 118 of the second fin 86 both form a tilt angle φ to a surface normal being between for instance between 0.5 and 1 degrees. However, the fins 84, 86 may advantageously protrude perpendicularly from the base 71 (and the exterior of the wind turbine blade).

The VG device is provided with the thickness-tapering angle θ and/or the trailing edge tapering angle α, as well as the optional tilt angle φ so that the VG device 70 may be moulded in a single piece and still be released from the mould without parts of the VG device 70 breaking off. At the same time, the function of the VG device 70 is not impaired compared to conventional VG devices. In an advantageous embodiment, the VG device is moulded as a unitary element made in a combination of PBT and polycarbonate.

With respect to the moulded VG device, it is for instance not necessary that the device comprises exactly one VG vane pair. The moulded VG device may for instance instead be formed as a strip comprising a plurality of VG fin pairs, or be formed with only a single fin arranged on a base or foot.

This is also the case for the VG device with the recess on the inner side of the base, where it is recognised that the device may be formed as a strip comprising a plurality of VG pairs. Also, it is recognised that this idea may be used for other flow guiding devices with parts protruding from an outer side of the strip/base, such as spoilers, Gurney flaps or the like.

Figure 10:
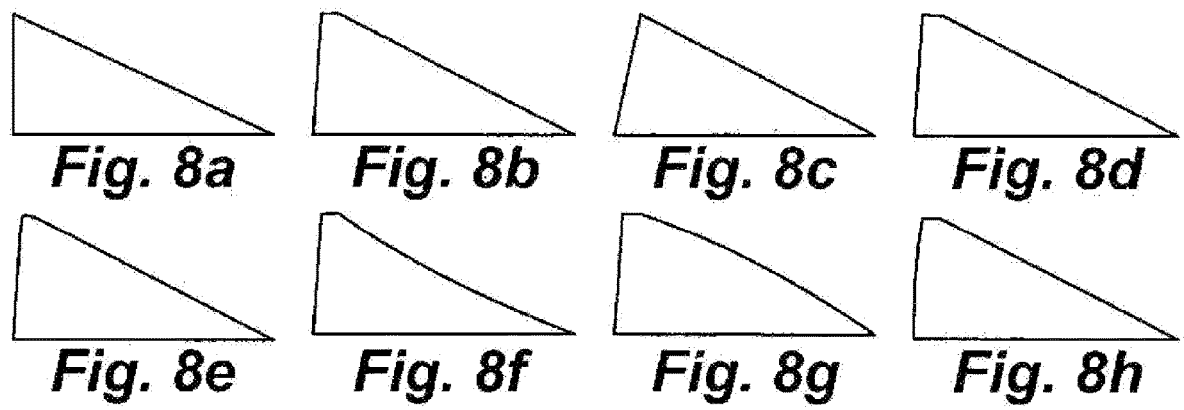
FIG. 10 shows a wind turbine blade being retrofitted with flow altering devices according to the invention.
Figure 10:
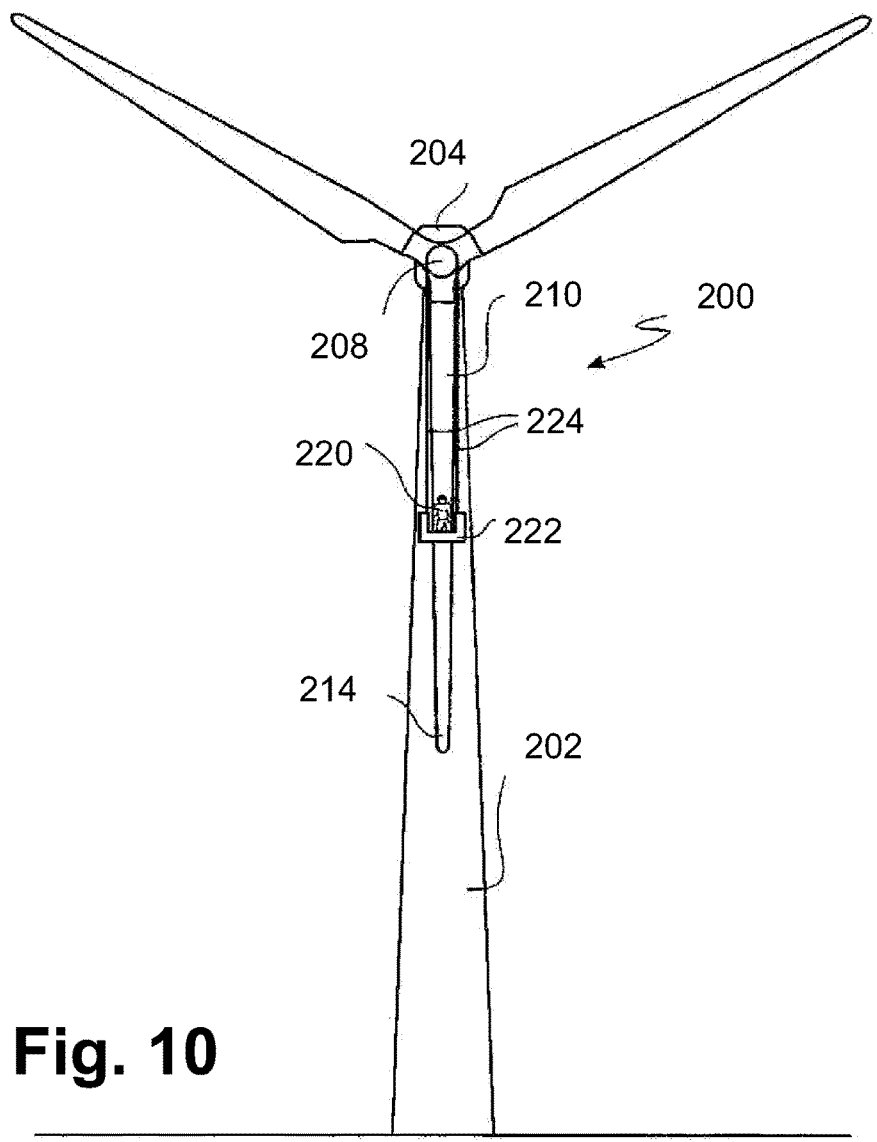

FIG. 10 illustrates a wind turbine 200 comprising a tower 202, a nacelle 204 and a rotor with a substantially horizontal rotor shaft. The rotor includes a hub 208 and three blades 210 extending radially from the hub 208. The rotor is stopped in a position, where one of the blades 210 is positioned substantially vertical with a tip end 214 pointing towards ground. Furthermore, the wind turbine blade 210 is pitched to a break position. A worker 220 is working on the wind turbine blade 210 and is hoisting down along the trailing edge of the blade 210 via a work platform 222 and a hoisting arrangement 224. The hoisting arrangement 224 comprises wires, which are connected (not shown) near the root of the wind turbine blade 210, e.g. to the hub 208 of the wind turbine 102.

According to other embodiment, the worker can use a cherry picker for getting access to the blade. Yet again, the worker may rappel down along the blade from a position above an area of application.

In the following, a method, mounting device and flow-altering devices according to the invention, e.g. for mounting and/or retrofitting flow-altering devices, e.g. VG devices illustrated and described herein to the exterior of a wind turbine blade is explained.

Figure 11:
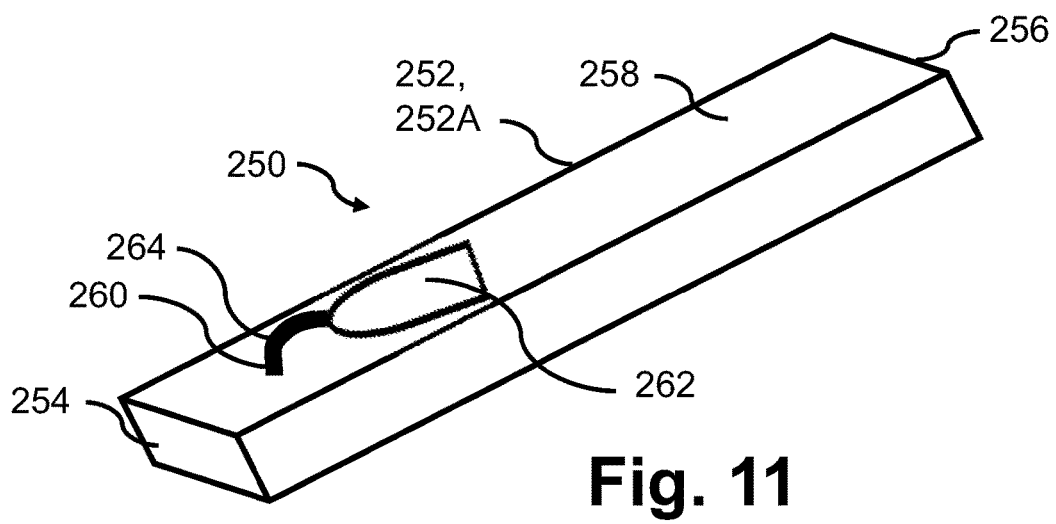
FIG. 11 shows a perspective view of a mounting device according to the invention.

FIG. 11 shows a schematic perspective view of an exemplary mounting device for mounting flow-altering devices on a wind turbine blade according to the present invention. The mounting device 250 comprises an elongate mounting panel 252 extending from a first end 254 to a second end 256 and having a first side (not shown) and a second side 258. The mounting panel 252 is made of a foamed polymer (PE) and comprises a port 260 for connecting a pressure source, e.g. a pump device, to the mounting panel. The mounting device 250 optionally comprises a pump device 262 connected or connectable to the port 260, e.g. via a pressure hose 264. The pressure hose 264 optionally forms a part of the mounting device 250. The port 260 is provided with a pressure source connector for releasably connecting the pump device 262 to the mounting panel 252. The mounting panel has a length of about 1 m, thus providing a mounting panel that is easy to handle, while enabling mounting of a plurality of flow-altering devices in one mounting operation. The mounting device 250 comprises a pressure release mechanism for releasing a pressure in the cavity. In the illustrated mounting device, the pressure source connector 260 and/or the pressure source 262 operates as the pressure release mechanism by decoupling the pressure source from the mounting panel and/or controlling the pressure source to apply a release pressure to the cavity through the port 260.

Figure 12:
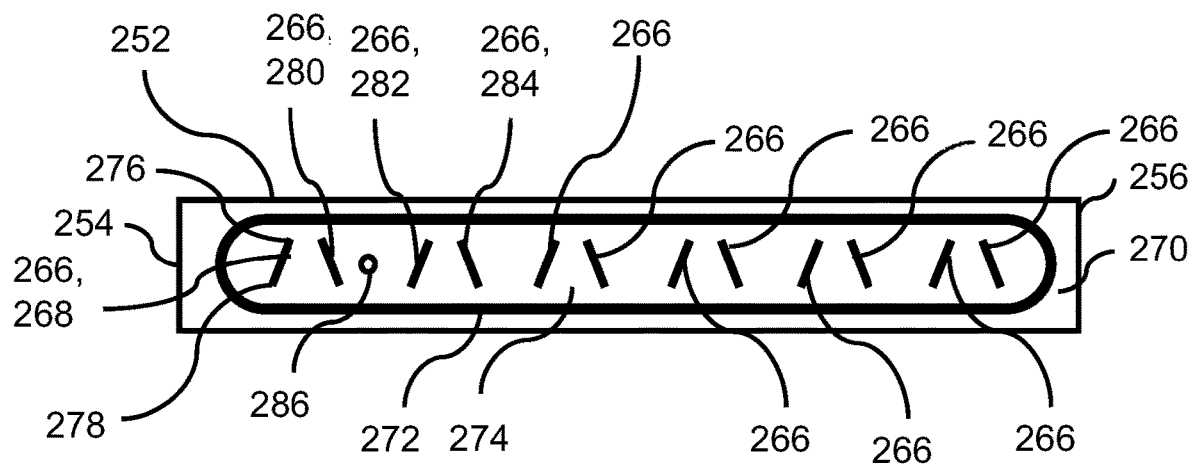
FIG. 12 shows a first side view of an exemplary mounting device without VG devices.

FIG. 12 shows a schematic first side view of the mounting device 250. Support recesses 266 including a first support recess 268 side for receiving a flow-altering device part of a flow-altering device are provided in the first side 270 of the mounting panel 252. Further, the mounting device 250 comprises a seal 272 encircling a first area 274 of the first side 270 for forming a cavity between a part of the first side of the mounting panel 252 and a surface of the wind turbine blade, the first area 274 including the first support recess 268.

The seal 272 is a rubber seal and is adhesively and/or mechanically attached to the first side 270 of the mounting panel 252. The seal 272 has a relaxed height $h_r$ in the range from 2 mm to 30 mm and a compression height $h_c$ in the range from 1 mm to 20 mm. The seal may comprise one or more channels formed in the seal material.

In general, the support recesses 266, e.g. the first support recess 268, are symmetric or asymmetric and extends from a first end 276 to a second end 278. In the mounting panel 252, the first support recess having a first depth D1 less than 10 mm near or at the first end 276 and a second depth D2 larger than 10 mm near or at the second end, wherein the first depth is different from the second depth. In the illustrated mounting panel 252, D1 is smaller than D2 and the mounting panel 252 is thus intended to be arranged on the wind turbine blade such that the first end 276 of a support recess is closer to the leading edge of the wind turbine blade than the second end of the same support recess. Thus, the mounting panel 252 is configured for mounting so-called diverging VG fin pairs on a wind turbine blade, where the trailing edge part fin distance of a fin pair is larger than the leading edge fin distance of the fin pair. An exemplary mounting panel may be configured for mounting so-called converging VG fin pairs on a wind turbine blade, where the trailing edge part fin distance of a fin pair is smaller than the leading edge fin distance of the fin pair. The mounting panel 252 comprises six sets of support recesses for arranging up to six VG pairs on a wind turbine blade, the sets of support recesses including a first set 268, 280 and second set 282, 284 of support recesses for receiving flow-altering device parts of a first flow-altering device and a second flow-altering device.

A pressure port 286 is arranged in the first side 270 within the first area 274, the pressure port 286 being in fluid communication with the port 260 via a channel (not shown) through the mounting panel 252. Thus, pressure source 262 is able to apply the negative pressure to the cavity formed by the first side 270 and wind turbine blade surface. The pressure port 286 also functions as an outlet release port, since the negative pressure in the illustrated mounting device 250 is released by decoupling the pressure source 262 from the mounting panel and/or controlling the pressure source 262 to apply a release pressure to the cavity.

Figure 13:
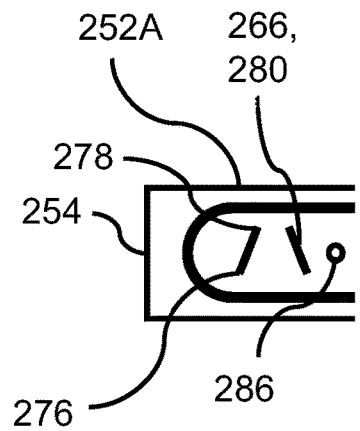
FIG. 13 shows a first side view of an exemplary mounting device without VG devices.

FIG. 13 illustrates a first side view of a part of an exemplary mounting panel 252A similar to mounting panel 252. The mounting panel 252A is configured for mounting so-called converging VG fin pairs on a wind turbine blade, where the trailing edge part fin distance of a fin pair is less than the leading edge fin distance of the fin pair.

Figure 14:
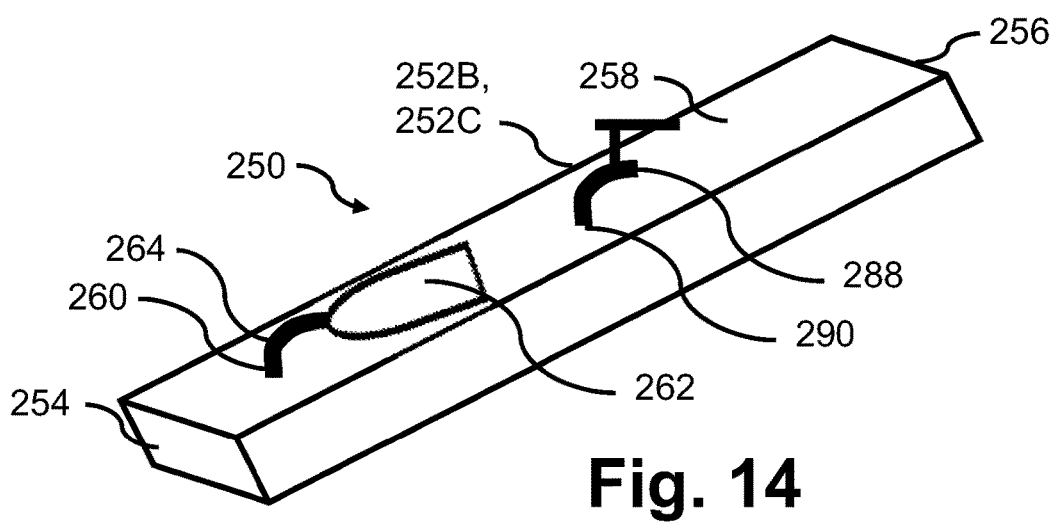
FIG. 14 shows a perspective view of a mounting device according to the invention.
Figure 15:
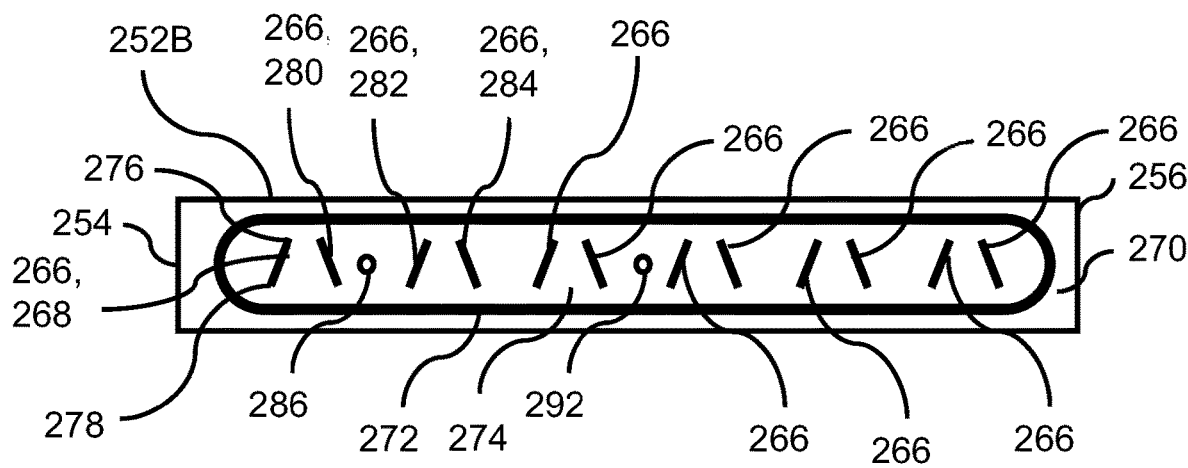
FIG. 15 shows a first side view of an exemplary mounting device without VG devices.
Figure 16:
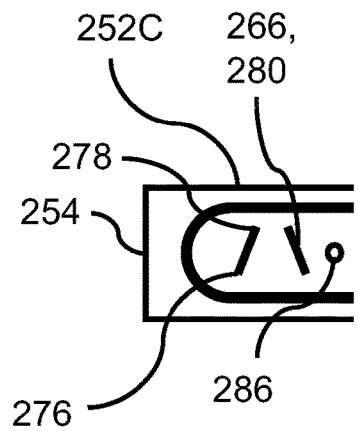
FIG. 16 shows a first side view of an exemplary mounting device without VG devices.

FIGS. 14-16 illustrate a mounting device with a pressure release mechanism separate from the pressure source. The pressure release mechanism is a release valve 288 connected to a release inlet port 290 in the second side of the mounting panel 252B, 252C. The release inlet port 290 is in fluid communication with release outlet port 292 arranged within the first area 274 in the first side 270 via a release channel (not shown) through the mounting panel 252B, 252C.

Figure 17:
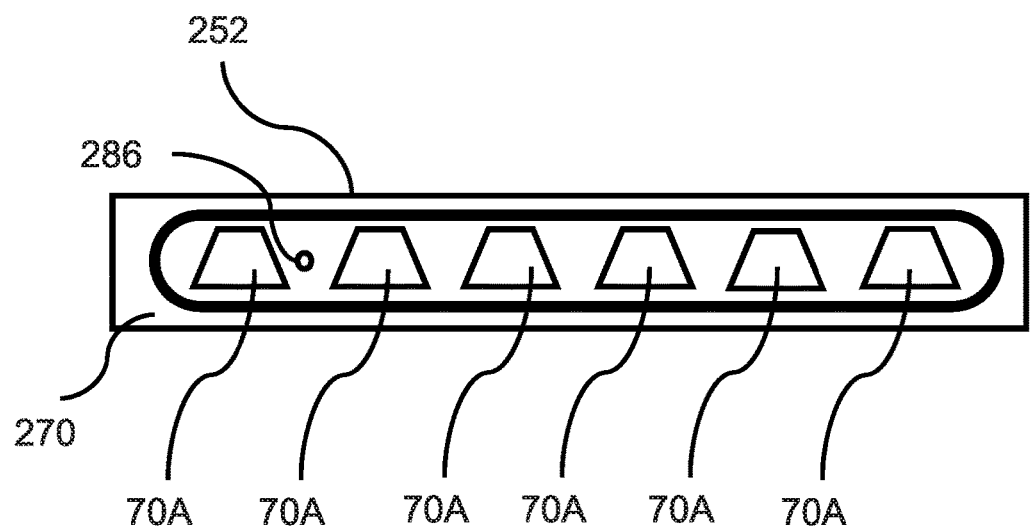
FIG. 17 shows a first side view of an exemplary mounting device with VG devices inserted in support recesses.

FIG. 17 shows a first side view of the mounting panel 252 with fins of six double-fin flow-altering devices 70A inserted into the first side 270 of the mounting panel in such a way that the fins of the VG devices 70 are inserted into the mounting panel 252 and the inner side of the VG devices are exposed from the first side 270 of the mounting panel 252.

Figure 18:
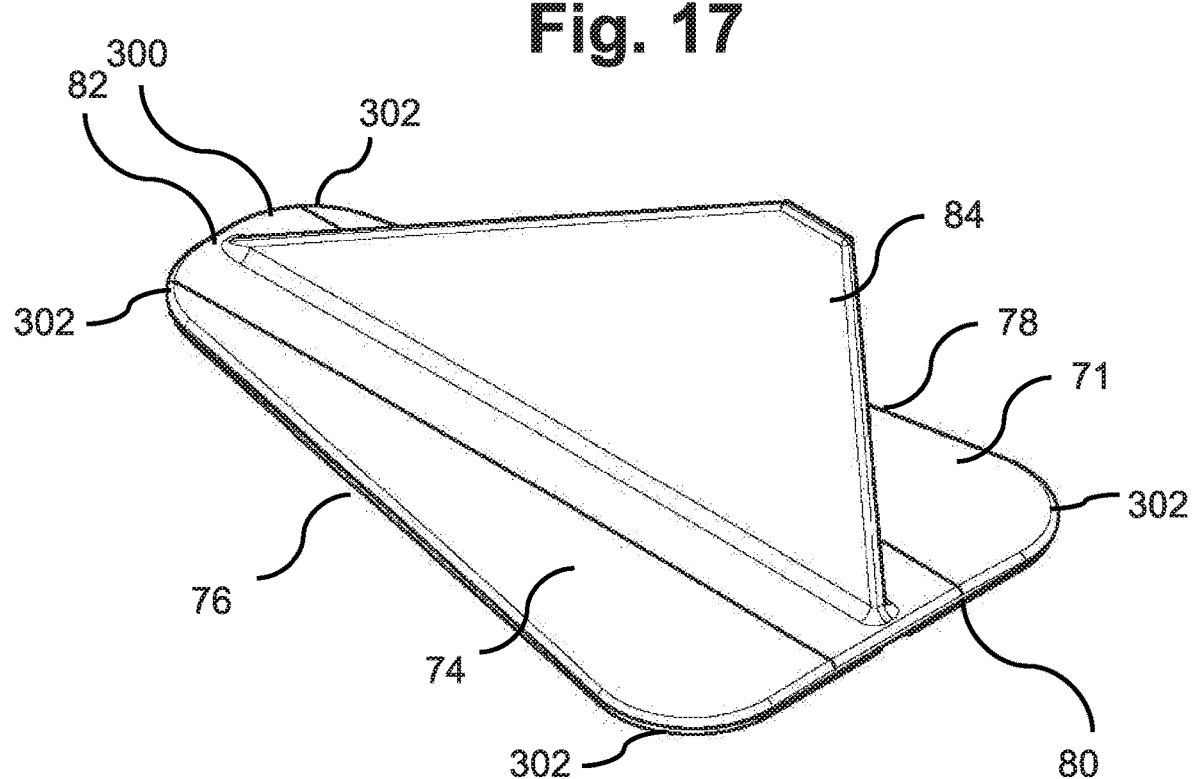
FIGS. 18-20 show different schematic views of a flow-altering device according to the present invention.

FIG. 18 shows a schematic perspective view of an exemplary flow-altering device being a single-fin VG device 300 comprising a base 71 having (when mounted to an exterior of the wind turbine blade), a concave inner side (not shown) for attaching to the exterior of the wind turbine blade, and an outer side 74 facing away from the exterior of the wind turbine blade. The base 71 has a first edge part 76, a second edge part 78, a third edge part 80 (or trailing edge part), and a fourth edge part 82 (or leading edge part). The base 71 is trapezium-shaped so that the third edge part 80 is straight and parallel to the straight fourth edge part 82 and so that a length of the fourth edge part 82 of the base 71 is smaller than a length of the third edge part 80 of the base 71. The edge of the base may comprise curved edge parts 302 or rounded corners. The VG device 300 has a single first fin 84, also called vane, which protrude from the outer side 74 of the base 71.

Figure 19:
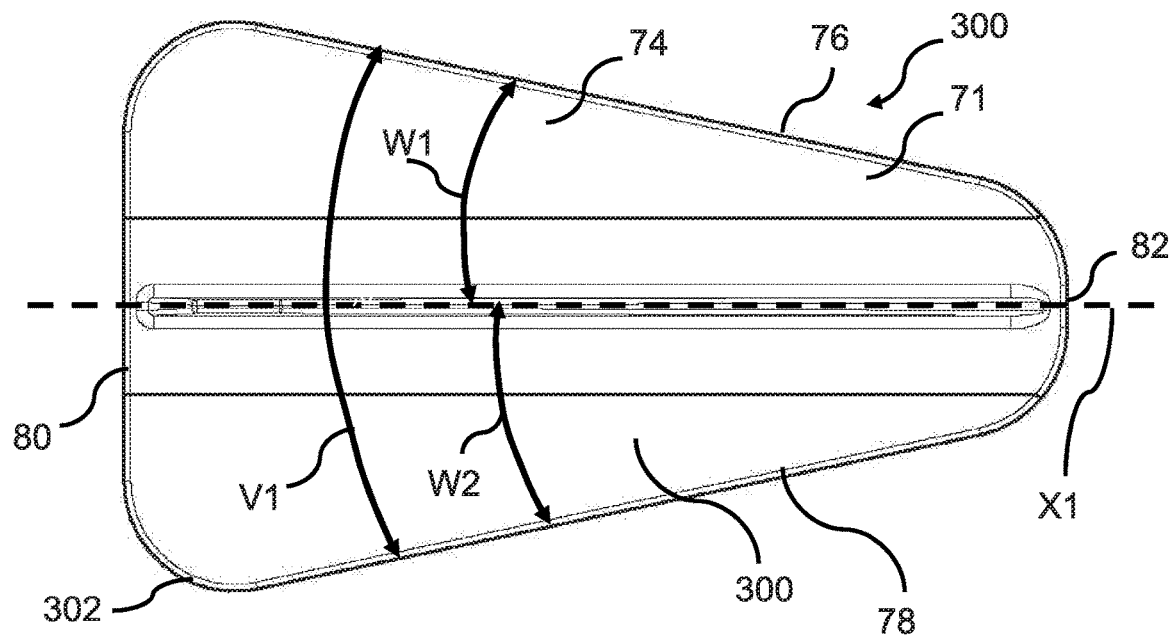

FIG. 19 shows an outer side view of the VG device 300. The VG device 300 comprises a first fin 84 protruding from the outer side 74 and extending along a first fin axis X1, the first fin axis X1 being parallel to the base. The first edge part 76 and the second edge part 78 form a primary angle V1 in the range from 5 degrees to 30 degrees, namely 24 degrees as illustrated. The first primary fin angle W1 between the first edge part 76 and the first fin axis X1 is in the range from 5 degrees to 30 degrees, namely 12 degrees as illustrated. The first secondary fin angle W2 between the second edge part 78 and the first fin axis X1 is in the range from 5 degrees to 30 degrees.

Figure 20:
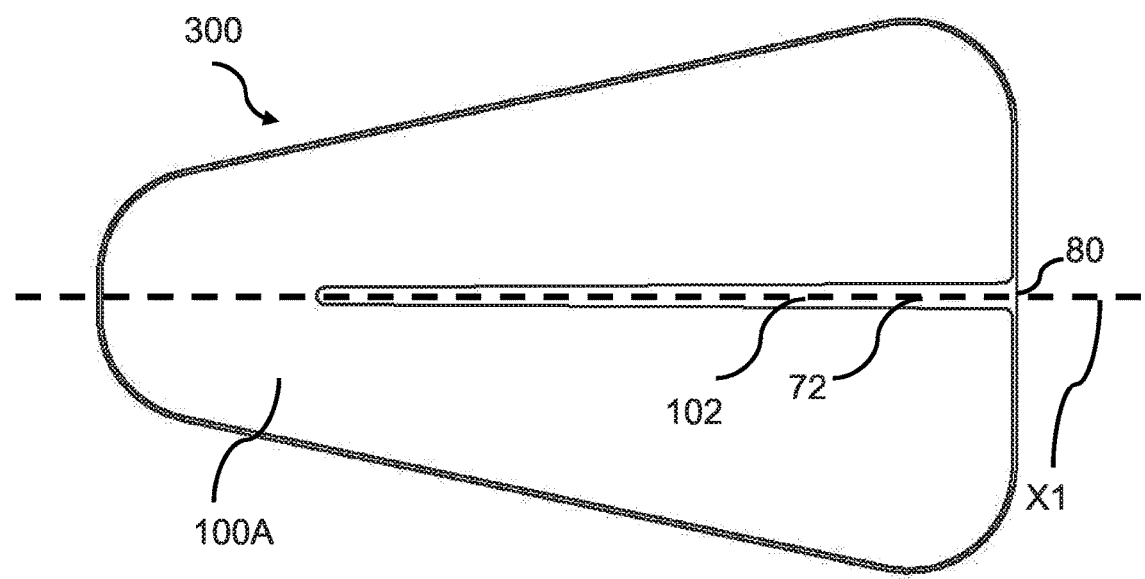

FIG. 20 shows an inner side view of the VG device 300 with an adhesive material 100A arranged on the inner side 72. The adhesive material 100A has a first slit 102 for reducing air bubble formation between the flow-altering device 300 and the surface of the wind turbine blade when the VG device 300 is mounted on a wind turbine blade. This is in particular advantageous when the inner side is curved. The first slit 102 extends from the third edge part (trailing edge part) of the flow altering device 300 in order to reduce the risk of water or debris being caught in the first slit 102 during operation of the wind turbine blade.

Figure 21:
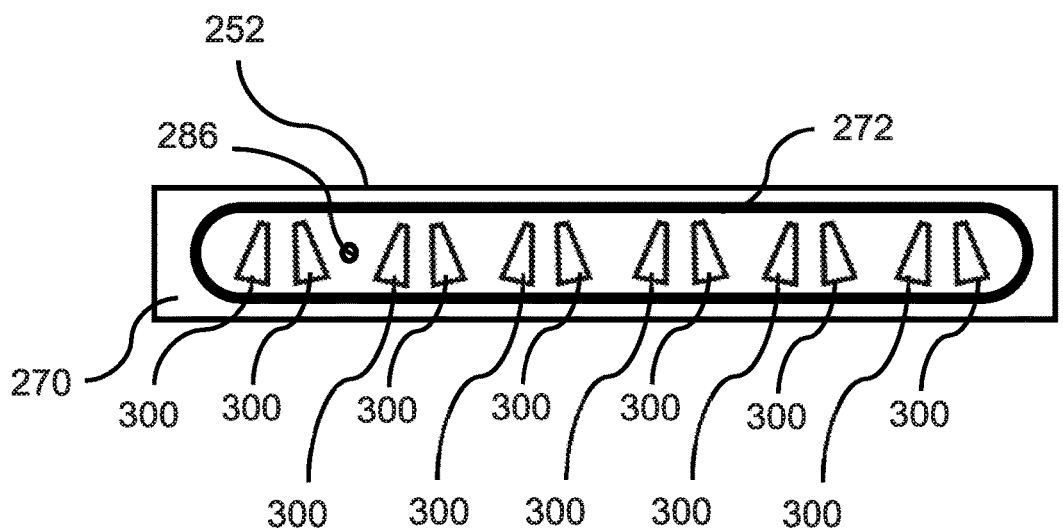
FIG. 21 shows a first side view of an exemplary mounting device with VG devices inserted in support recesses.

FIG. 21 shows a first side view of the mounting panel 252 with first fins of twelve single-fin flow-altering devices 300 inserted into the first side 270 of the mounting panel in such a way that the first fins of the VG devices 300 are inserted into the mounting panel 252 and the inner side of the VG devices are exposed from the first side 270 of the mounting panel 252. Asymmetric support recesses in the mounting panel facilitate correct insertion of the flow-altering devices to ensure that the first end of the first fin is mounted closest to the leading edge.

Figures 22, 23:
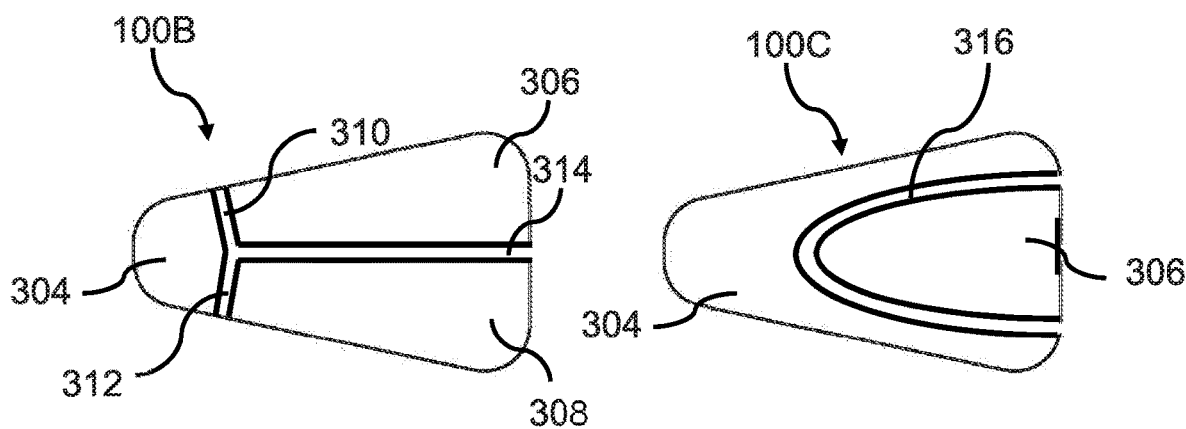
FIGS. 22-24 show exemplary adhesive materials of a flow-altering device according to the invention.

FIG. 22 shows an exemplary adhesive material of a flow-altering device according to the invention, e.g. flow-altering device 300. The adhesive material 100B comprises a first part 304, a second part 306 and a third part 308, wherein the parts of the adhesive material are separated by different channel sections 310, 312, 314 of a channel formed between the adhesive material parts 304, 306, 308. In addition to reducing the formation of air bubbles, the channel sections between different parts of the adhesive material prevents or at least reduces the risk of water being trapped between the surface of the wind turbine blade and the flow-altering device during operation of the wind turbine blade. The first channel section 310 is configured to extend from the first edge part of a flow-altering device. The second channel section 312 is configured to extend from the second edge part of a flow-altering device. The third channel section 314 is configured to extend from the third edge part of a flow-altering device. The first channel section 310 is connected to both the second channel section 312 and the third channel section 314.

FIG. 23 shows an exemplary adhesive material of a flow-altering device according to the invention, e.g. flow-altering device 300. The adhesive material 100C comprises a first part 304 and a second part 306 separated by a channel 316 having ends at the third edge part of a flow-altering device. It is to be understood that a combination of one or more slits and a channel/channel sections may be employed.

Figure 24:
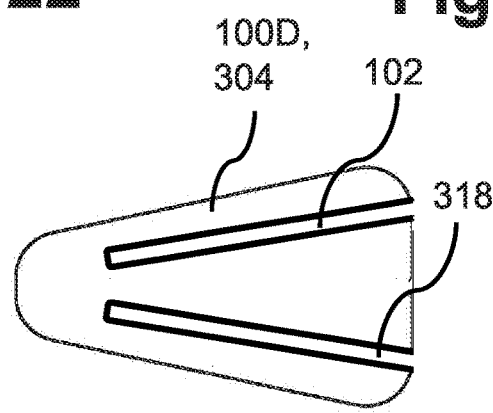

FIG. 24 shows an exemplary adhesive material of a flow-altering device according to the invention, e.g. flow-altering device 300. The adhesive material 100D has a first slit 102 and a second slit 318 extending from the third edge part of a flow-altering device for reducing air bubble formation between the flow-altering device and the surface of the wind turbine blade when the flow-altering device is mounted on a wind turbine blade. When mounted, the first slit 102 and the second slit 318 extends from the third edge part of the flow-altering device.

LIST OF REFERENCES 2 wind turbine
4 tower
6 nacelle
8 hub
10 wind turbine blade
14 blade tip
16 blade root
18 leading edge
20 trailing edge
30 root region
32 transition region
34 airfoil region
50 airfoil profile
52 pressure side
54 suction side
56 leading edge
58 trailing edge
60 chord
62 camber line
70, 70A, 300 vortex generator device
71 base
72 inner side
74 outer side
76 first edge part
78 second edge part
80 third edge part
82 fourth edge part 84 first fin
86 second fin
90 recess
92 wall
100, 100A, 100B, 100C, 100D adhesive material
102 first edge portion
104 first end
106 second end
108 intermediate edge portion
110 second edge portion
112 first side of fin
114 second side of fin
116 first tilt axis
118 second tilt axis
200 wind turbine
202 tower
204 nacelle
208 hub
210 wind turbine blade
214 blade tip
220 worker
222 work platform
224 hoisting arrangement
250 mounting device
252, 252A, 252B, 252C mounting panel
254 first end of mounting panel
256 second end of mounting panel
258 second side of mounting panel
260 port/pressure source connector for connecting a pressure source
262 pump device
264 pressure hose
266 support recess
268 first support recess
270 first side of mounting panel
272 seal
274 first area
276 first end of support recess
278 second end of support recess
280 first support recess
282 second support recess
284 second support recess
286 pressure port
288 release valve
290 release inlet port
302 curved edge parts
304 first part of adhesive material
306 second part of adhesive material
308 third part of adhesive material
310 first channel section
312 second channel section
314 third channel section
316 channel
318 second slit
X1 first fin axis
V1 primary angle
W1 first primary fin angle
W2 first secondary fin angle

The invention claimed is:

1. A method of mounting flow-altering devices on a wind turbine blade, the flow-altering devices being of the type having a base comprising an inner side for attaching onto a surface of the wind turbine blade, and an outer side with one or more flow-altering device parts protruding from the base, the method comprising:

providing a mounting device with a mounting panel supporting one or more flow-altering devices, the one or more flow-altering devices including a first flow-altering device;

arranging the mounting panel on an area of application on the surface of the wind turbine blade with an adhesive material between the inner side of the first flow-altering device and the surface of the wind turbine blade, and with a seal between the mounting panel and the surface to form a cavity between the mounting panel and the surface of the wind turbine blade;

applying a negative pressure in the cavity;

releasing the negative pressure in the cavity; and removing the mounting panel from the area of application on the surface of the wind turbine blade.

2. The method according to claim 1, wherein the mounting panel comprises a port, and wherein the negative pressure is applied through the port.

3. The method according to claim 1, wherein the mounting device comprises a pressure release mechanism for releasing a pressure in the cavity, and wherein the negative pressure in the cavity is released by activating the pressure release mechanism.

4. The method according to claim 1, the one or more flow-altering devices comprising a second flow-altering device.

5. The method according to claim 1, wherein the adhesive material comprises an adhesive film, such as a double adhesive tape, which is covered by a peel-off layer, and wherein the method comprises removing the peel-off layer prior to arranging the mounting panel on the area of application.

6. The method according to claim 5, wherein the adhesive material has one or more slits for reducing air bubble formation between the first flow-altering device and the surface of the wind turbine blade.

7. The method according to claim 5, wherein the adhesive material is V-shaped, E-shaped, U-shaped or trident-shaped for reducing air bubble formation between the first flow-altering device and the surface of the wind turbine blade.

8. The method according to claim 1, wherein providing a mounting panel supporting one or more flow-altering devices comprises inserting flow-altering device parts of the one or more flow-altering devices into corresponding support recesses in the mounting panel.

9. The method according to claim 1, wherein the one or more flow-altering devices comprises vortex generator devices and/or turbulence generator devices.

10. A mounting device for mounting flow-altering devices on a wind turbine blade, the mounting device comprising:

an elongate mounting panel having a first side and a second side, the mounting panel having a first support recess in the first side for receiving a flow-altering device part of a flow-altering device; and a seal encircling a first area of the first side for forming a cavity between a part of the first side of the mounting panel and a surface of the wind turbine blade, the first area including the first support recess, wherein the mounting panel comprises a port for connecting a pressure source to the cavity.

11. The mounting device according to claim 10, wherein the mounting device comprises a pressure release mechanism for releasing a pressure in the cavity.

* * * * *